United States Patent
Yamanaka et al.

(10) Patent No.: US 8,442,597 B2
(45) Date of Patent: May 14, 2013

(54) TELEPHONE APPARATUS HAVING CALLING CARD SUPPORT FUNCTION AND HANDSFREE APPARATUS

(75) Inventors: Mariko Yamanaka, Nagoya (JP); Naoki Matsuda, Anjo (JP)

(73) Assignee: Denso Corporation, Kariya (JP)

( * ) Notice: Subject to any disclaimer, the term of this patent is extended or adjusted under 35 U.S.C. 154(b) by 407 days.

(21) Appl. No.: 12/661,729

(22) Filed: Mar. 23, 2010

(65) Prior Publication Data

US 2010/0248684 A1    Sep. 30, 2010

(30) Foreign Application Priority Data

Mar. 26, 2009    (JP) ................... 2009-076309

(51) Int. Cl.
*H04M 1/00*    (2006.01)
*H04W 24/00*    (2009.01)

(52) U.S. Cl.
USPC ............. 455/569.2; 455/456.3; 455/558

(58) Field of Classification Search .......... 455/406–408, 455/435.1–435.3, 550.1, 558, 569.1–569.254; 379/91.01, 91.02, 111, 114.15–114.2, 127.1, 379/143–144.01, 144.04, 155, 273, 357.01–357.02; 370/330, 352, 356; 235/380, 449, 451, 493–494; 340/825.33, 825.34
See application file for complete search history.

(56) References Cited

U.S. PATENT DOCUMENTS

| | | | |
|---|---|---|---|
| 5,594,779 A * | 1/1997 | Goodman | 455/3.04 |
| 6,009,156 A | 12/1999 | Cross | |
| 7,155,584 B2 * | 12/2006 | Beckert et al. | 711/160 |
| 2006/0154697 A1 * | 7/2006 | Brailovskiy et al. | 455/569.1 |
| 2007/0121842 A1 * | 5/2007 | Bond et al. | 379/114.2 |
| 2008/0280649 A1 * | 11/2008 | Prise | 455/558 |
| 2010/0285773 A1 | 11/2010 | Matsuda | |
| 2011/0035604 A1 * | 2/2011 | Habraken | 713/193 |

FOREIGN PATENT DOCUMENTS

| | | |
|---|---|---|
| JP | 5-22477 | 1/1993 |
| JP | 5-122408 | 5/1993 |
| JP | 2001-016300 | 1/2001 |
| JP | 2001-211271 | 8/2001 |
| JP | 2002-216194 | 8/2002 |
| JP | 2002-223288 | 8/2002 |
| JP | 2007-221274 | 8/2007 |

* cited by examiner

*Primary Examiner* — George Eng
*Assistant Examiner* — Inder Mehra
(74) *Attorney, Agent, or Firm* — Harness, Dickey & Pierce, PLC

(57) ABSTRACT

A telephone apparatus having a calling card support function is disclosed. The telephone apparatus includes: a card information storage section for storing therein card information on a calling card; a controller for making a telephone call with use of the card information stored in the card information storage section, by using telephone communication means; and a card information reception section for receiving the card information stored in a cellular phone from the cellular phone. The controller allows the card information reception section to receive the card information stored in the cellular phone from the cellular phone. The controller records the received card information in the card information storage section when the card information reception section receives the card information stored in the cellular phone from the cellular phone.

4 Claims, 5 Drawing Sheets

FIG. 2

CARD INFO. STORAGE AREA

| CALLING CARD CLASSIFICATION | CARD INFO. | |
|---|---|---|
| | ACCESS NUMBER | PIN CODE |
| CALLING CARD "A" | a1 | a1 |
| CALLING CARD "B" | b1 | b2 |
| CALLING CARD "C" | c1 | c2 |
| ⋮ | ⋮ | ⋮ |
| CALLING CARD "N" | n1 | n2 |

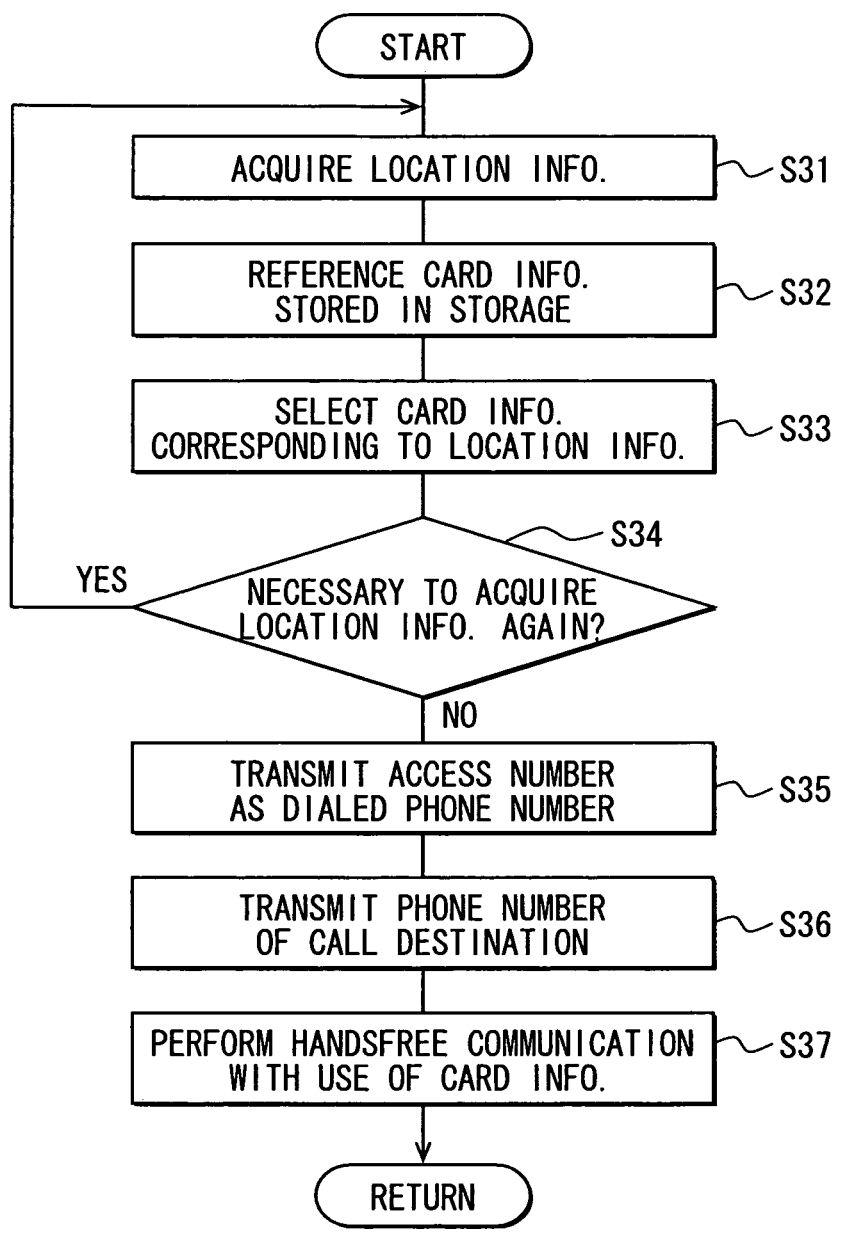

TELEPHONE APPARATUS HAVING CALLING CARD SUPPORT FUNCTION AND HANDSFREE APPARATUS

CROSS REFERENCE TO RELATED APPLICATION

The present application is based on Japanese Patent Application No. 2009-76309 filed on Mar. 26, 2009, disclosure of which is incorporated herein by reference.

BACKGROUND OF THE INVENTION

1. Field of the Invention

The present invention relates to a telephone apparatus having a calling card support function, and also relates to a handsfree apparatus for a vehicle.

2. Description of Related Art

There is known a telephone apparatus having a calling card support function, which enables a telephone call using card information on a calling card (see JP-H5-22477A, JP-H11-239232A corresponding to U.S. Pat. No. 6,009,156, and JP-H5-122408A)

According to such telephone apparatus, a user can input card information (e.g., access number and PIN code) appearing on a front surface of a calling card to the telephone apparatus, so that the card information is stored in the telephone apparatus. Then, a user can directly input a telephone number of a call destination or select the telephone number of the call destination by referencing phone book date, and then the telephone apparatus transmits the access number as a dialed telephone number to a center (i.e., a center that provides telephone service using card information on a calling card) and transmits the PIN code to the center. Provided that authentication of the PIN code is successful, the telephone apparatus and the call destination are connected to each other via a telephone communication link, and the telephone communication becomes possible.

The inventors of the present application have found that conventional techniques involve the following difficulty. To enable the telephone communication using card information on a calling card, the card information should be stored in the telephone apparatus in advance. A method for a user to record card information in the telephone apparatus is user direct operation of the telephone apparatus. When an environment for user operation of the telephone apparatus is constrained by, for example, location, structure or the like of the telephone apparatus, a stranger can watch user operation of inputting card information, and as a result, the stranger can discover the card information. Security cannot be assured. It should be noted that the above-described patent documents fail to teach and suggest measures against this difficulty.

SUMMARY OF THE INVENTION

In view of the above and other difficulties, it is an objective of the present invention to provide a telephone apparatus having a calling card support function, the telephone apparatus being capable of enhancing security when card information on a calling card is recorded in the telephone apparatus. It is also an objective of the present invention to provide a handsfree apparatus for a vehicle.

According to a first aspect of the present invention, a telephone apparatus having a calling card support function is provided. The telephone apparatus includes: a card information storage section provided to store therein card information on a calling card; a controller configured to make a telephone call with use of the card information on the calling card stored in the card information storage section, by using telephone communication means; and a card information reception section provided to receive, from a cellular phone, the card information on the calling card stored in the cellular phone. The controller is further configured to allow the card information reception section to receive, from the cellular phone, the card information on the calling card stored in the cellular phone. The controller is further configured to record the card information on the calling card received by the card information reception section in the card information storage section when the card information reception section receives the card information on the calling card stored in the cellular phone from the cellular phone.

According to a second aspect of the present invention, a handsfree apparatus for a vehicle is provided. The handsfree apparatus includes: a location information acquisition device, a communication interface device, a storage medium and a controller. The location information acquisition device is configured to acquire location information indicative of a present location of the vehicle. The communication interface device is communicatable with a cellular phone via a local wireless communication link using a data transfer protocol for data transfer and a handsfree protocol for handsfree communication. The cellular phone stores therein card information on multiple calling cards on a calling-card-by-calling-card basis. The card information on each calling card includes an access number and a PIN code of the calling card. The controller that is configured to: determine whether the handsfree apparatus is powered-on or powered-off; establish a connection between the communication interface device and the cellular phone via the local wireless communication link, upon determining that the handsfree apparatus is powered-on; receive the card information on the multiple calling cards from the cellular phone via the local wireless communication link using the data transfer protocol; record the received card information on the multiple calling cards in the storage medium on the calling-card-by-calling-card basis upon receiving the card information on the multiple calling cards from the cellular phone, without requiring a user to directly input the card information to the handsfree apparatus; determine, in response to a handsfree communication request from a user, which one of the multiple calling cards provides cheapest telephone service at the present location of the vehicle; perform the handsfree communication with use of the card information on the one of the multiple calling cards that provides the cheapest telephone service, by utilizing the communication interface device and the cellular phone connected with other via the local wireless communication link using the handsfree protocol; and erase the card information on the multiple calling card from the storage medium upon determining that the handsfree apparatus is powered-off.

According to the above telephone apparatus and the handsfree apparatus, it is possible to enhance when card information on a calling card is recorded in the telephone apparatus or the handsfree apparatus.

BRIEF DESCRIPTION OF THE DRAWINGS

The above and other objects, features and advantages of the present invention will become more apparent from the following detailed description made with reference to the accompanying drawings. In the drawings:

FIG. 2 is a diagram illustrating a card information storage area of a storage medium;

FIG. 6 is a flowchart illustrating a telephone communication process with use of card information on a calling card according to a second embodiment.

DETAILED DESCRIPTION OF THE EXEMPLARY EMBODIMENTS

First Embodiment

A first embodiment is illustrated below with reference to FIGS. 1 to 5. In the first embodiment, a telephone apparatus having a calling card support function is applied to an in-vehicle navigation apparatus having a Bluetooth (registered trademark, also referred to as BT) communication function and a handsfree communication function. In the present embodiment, it is assumed that a cellular phone supporting a BT communication function is carried into a compartment of a vehicle equipped with the in-vehicle navigation apparatus, and the in-vehicle navigation apparatus and the cellular phone are communicatable with each other via a BT communication link.

Figure 1:
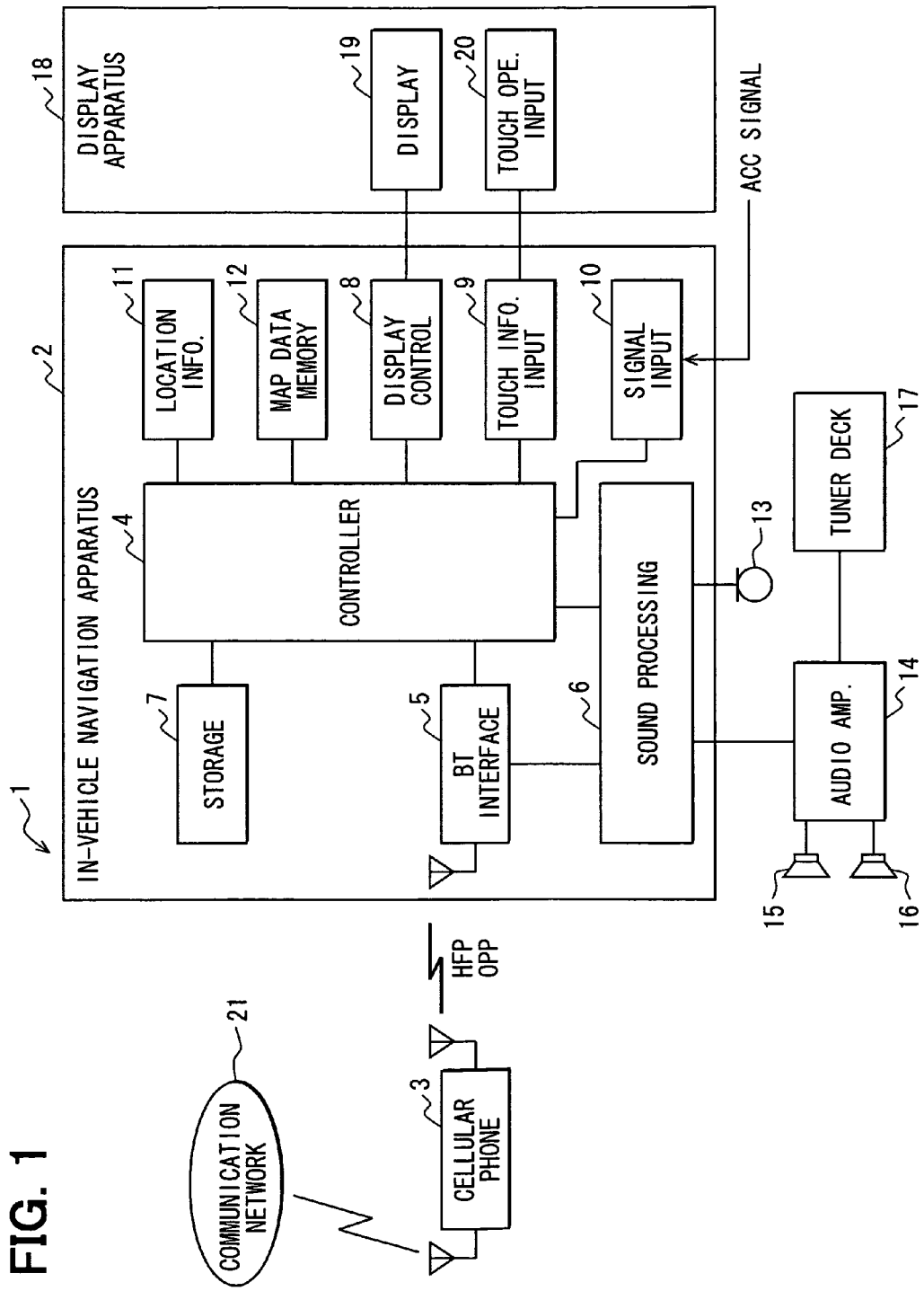
FIG. 1 is a functional block diagram illustrating an in-vehicle navigation system according a first embodiment.

As shown in FIG. 1, an in-vehicle navigation system 1 includes an in-vehicle navigation apparatus 2 and a cellular phone 3. The in-vehicle navigation apparatus 2 includes a controller 4, a BT interface device 5, a communication sound processing device 6, a storage medium 7, a display control device 8, a touch information input device 9, a signal input device 10, a location information acquisition device 11 and a map data storage device 12.

The controller 4 has a microcomputer, which includes a CPU, RAM, ROM, I/O bus and like. The controller 4 controls generally all of operations of the in-vehicle navigation apparatus 2, including communication operation, information management operation and the like. The BT interface device 5 has a function to perform BT communications with the cellular phone 3. In a state where the BT interface device 5 and the cellular phone 3 are connected with each other via a BT communication link, the BT interface device 5 can implement connections (named multi-connections) to the cellular phone 3 simultaneously using a handsfree profile (HFP) for handsfree communication, an object push profile (OPP) for transfer of various data and the like.

The communication sound processing device 6 is connected with a microphone 13. The microphone 13 is located in the compartment of the vehicle, more specifically, located at a place where the microphone 13 can efficiently collect the voice of a user. For example, the microphone 13 is located in the vicinity of a steering wheel. The communication sound processing device 6 is further connected with a audio amplifier 14. The audio amplifier 14 is external with respect to the in-vehicle navigation apparatus 2 and is connected with two speakers 15, 16. The speaker 15 is located at a driver side door and the speaker 16 is located at a front passenger side door for example. The audio amplifier 14 is further connected with a tuner deck 17. When the tuner deck 17 inputs an audio signal to the audio amplifier 14, the audio amplifier 14 amplifies the audio signal and outputs audio content of the audio signal from the speakers 15 and 16. The audio content may be music read from a storage medium for music, a radio program received from a radio station or the like.

The storage medium 7 is configured to have a storage area capable of storing various data. The storage medium 7 has a card information storage area for storing card information on a calling card. As shown in FIG. 2, in the storage medium 7, the card information storage area is reserved so that card information on multiple calling card can be stored on a calling-card-by-calling-card basis. The card information on each calling card includes an access number, a PIN code and the like. In FIG. 2, the access number "a1", "b1", "c1", . . . or "n1" is a telephone number with a predetermined number of digits, and the PIN code "a2", "b2", "c2", . . . or "n2" is an identification number with a predetermined number of digits.

In addition to the card information storage area for storing card information on a calling card, the storage medium 7 has a phone book data storage area, an outgoing call storage area and an incoming call storage area. The phone book data storage area is used for storing phone book data, which represents a relationship between telephone numbers and registered names. The outgoing call history data storage area is used for storing outgoing call history data, which represents a relationship between a time of making an outgoing call and a telephone number of the call destination. The incoming call history data storage area is used for storing incoming call history data, which represents a relationship between a time of receiving an incoming call and a telephone number of the caller. In the above, the outgoing call associated with the outgoing call history data is one made with the in-vehicle navigation apparatus 2 or the cellular phone 3 connected with the in-vehicle navigation apparatus 2 via the HFP. The incoming call associated with the outgoing call history data is one received with the in-vehicle navigation apparatus 2 or the cellular phone 3 connected with the in-vehicle navigation apparatus 2 via the HFP.

The signal input device 10 inputs an accessory signal (ACC signal) from a key switch to the controller 4. When the ACC signal from the key switch is in ON (i.e., high level), the controller 4 powers-on the in-vehicle navigation apparatus 2 so that operating power from an in-vehicle battery is supplied to all of the functional blocks of the in-vehicle navigation apparatus 2. In this case, the in-vehicle navigation apparatus 2 is in a waking up mode and performs normal operation. When the ACC signal from the key switch is OFF (i.e., low level), the controller 4 powers-off the in-vehicle navigation apparatus 2 so that operating power from the in-vehicle battery is supplied to the selected one or ones of the functional blocks of the in-vehicle navigation apparatus 2. In this case, the in-vehicle navigation apparatus 2 in a sleep mode and performs low power consumption operation.

The location information acquisition device 11 includes a GPS receiver, a G sensor, a distance sensor and the like. The GPS receiver receives a GPS signal from GPS satellite and calculates various parameters. The G sensor detects acceleration. The distance sensor detects traveling distance of the vehicle. The location information acquisition device 11 acquires the present location of the vehicle based on a calculation result of the GPS receiver and detection results of various sensors. The location information acquisition device 11 outputs location information indicative of the present location of the vehicle to the controller 4.

The map data storage device 12 stores map data including road data representative of road shape, the number of lanes and the like, intersection data representative of location and type of intersection and the like, etc.

A display apparatus 18 includes a display device 19 and a touch operation input device 20. The display device 19 perform display operation including displaying a variety of images and windows. The touch operation input device 20 provides a touch sensitive switch on the image or the window. When receiving a display instruction signal from the controller 4, the display control device 8 controls the display operation of the display device 19 based on the display instruction signal. When the touch information input device 9 receives an operation detection signal from the touch operation input device 20 in response to user operation of the touch switch on the window or the image, the touch information input device 9 outputs the operation detection signal to the controller 4, and the controller 4 analyzes the operation detection signal.

The controller 4 has a navigation function, examples of which are as follows. A current location mark corresponding to the location information inputted from the location information acquisition device 11 is superimposed on a map image, which is represented by map data read from the map data storage device 12. A notification is made when, for example, the present location of the vehicle comes close to an intersection. A destination is set to a point that meets a condition (e.g., name, telephone number) inputted via user operation of the touch operation input device 20. A route from the present location to the destination is retrieved. Route guidance is performed along the retrieved route. Further, the controller 4 has a function to record the card information in the card information storage area of the storage medium 7. In the above, the card information may be inputted via user operation of the touch operation input device 20. Alternatively, as described below in detail, the card information may be inputted from the cellular phone 3 via a BT communication link.

The cellular phone 3 includes a controller, a telephone communication device, a BT interface device, a key input device, a storage medium, a display device, a microphone and a speaker. The controller controls generally all of operation of the cellular phone 3. The telephone communication device performs telephone communication via a communication network 21. The BT interface device performs BT communication. The key input device has various keys, which are arranged for user operation. The storage medium has various storage areas, including: an incoming mail information storage area for storing incoming mail information (e.g., reception date and time, an origin, a title, a body text) associated with an incoming mail that is received with the cellular phone 3 via the communication network 21; an outgoing mail information storage area for storing outgoing mail information (e.g., sending date ad time, an origin, a title, a body text) associated with an outgoing mail that is transmitted from the cellular phone 3 via the communication network 21; a phone book data storage area for storing phone book data representative of a relationship between telephone numbers and registered names; and the like. The display device displays various images and windows. The microphone receives voice uttered by a user. The speaker for outputting an incoming voice based on a voice signal from the other party.

In addition to the incoming mail information storage area, the outgoing mail information storage area and the phone book data storage area, the storage medium of the cellular phone 3 has a card information storage area for storing card information on a calling card in a manner similar to that in the storage medium of the in-vehicle navigation apparatus 2. The controller of the cellular phone 3 has a function to record card information on a calling card in the storage medium in response to user operation of the key input device.

The BT interface device of the cellular phone 3 has a function to perform BT communication with the in-vehicle navigation apparatus 2. The BT interface device of the cellular phone 3 can have connection simultaneously using HFP, OPP and the like in a manner similar to that in the BT interface device 5 of the in-vehicle navigation apparatus 2. In one embodiment, the communication network 21 includes an apparatus for providing cellular phone communication service, such as a cellular phone base station, a base station control apparatus and the like. In addition to the HFP and the OPP, the connection of the in-vehicle navigation apparatus 2 and the cellular phone 3 may use a phone book access profile (PBAP), a message access profile (MAP) and the like. The PBAP is for transfer of phone book data, incoming call history data and outgoing call history data. The MAP is for e-mail transfer. In the above, the e-mail is used as an inclusive term of text message, image information and the like that are exchanged via computer network.

Figure 3:
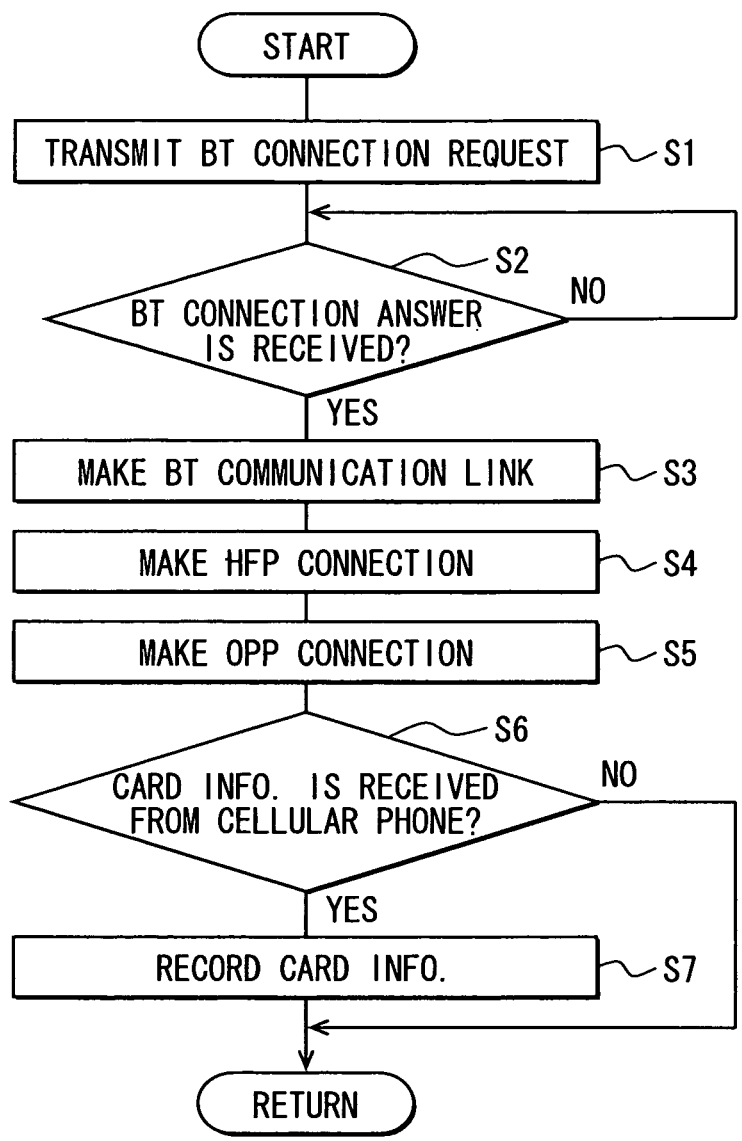
FIG. 3 is a flowchart illustrating a BT communication link connection process.
Figure 4:
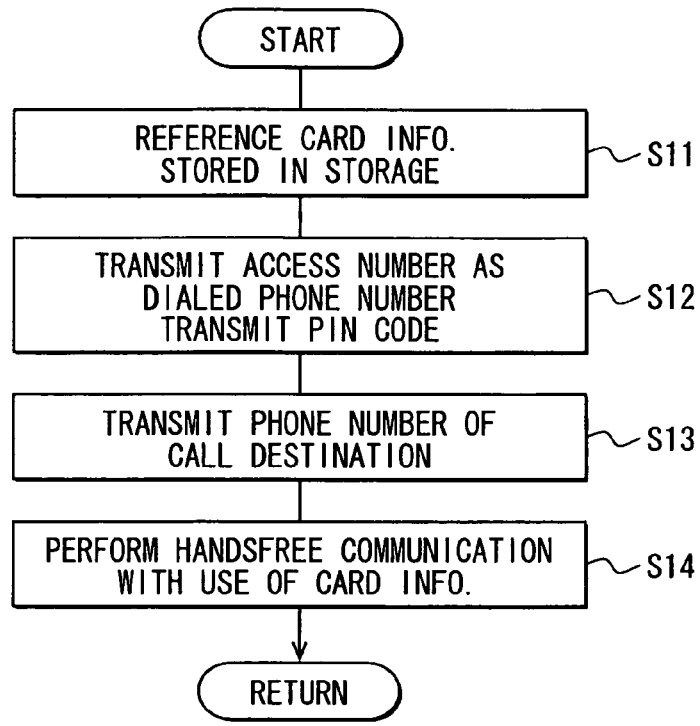
FIG. 4 is a flowchart illustrating a telephone communication process with use of card information on a calling card according to the first embodiment.
Figure 5:
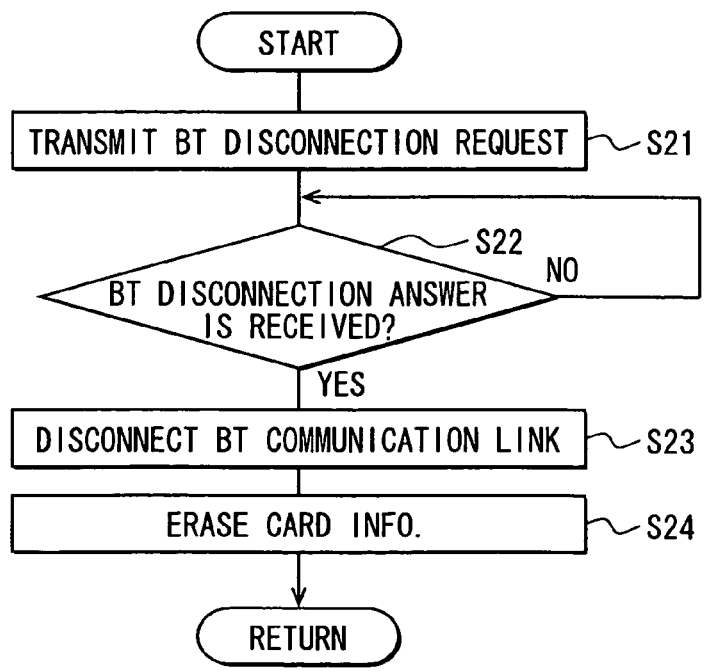
FIG. 5 is a flowchart illustrating a BT communication link disconnection process.

Operation of the in-vehicle navigation apparatus 2 will be described below with reference to FIGS. 3 to 5. FIG. 3 is a flowchart illustrating a BT communication link connection process. FIG. 4 is a flowchart illustrating a telephone communication process with use of card information on a calling card. FIG. 5 is a flowchart illustrating a BT communication link disconnection process. The processes illustrated in FIGS. 3 to 5 are performed by the in-vehicle navigation apparatus 2. In the followings, the BT communication link connection process, the telephone communication process and the BT communication link disconnection process will be explained below on an assumption that the cellular phone 3 and the in-vehicle navigation apparatus 2 are connectable with each other via the BT communication link (i.e., in a BT communicatable range) and are to perform handsfree communication.

(1) BT Communication Link Connection Process

As described above, when the ACC signal from the key switch is in OFF, the controller 4 powers-off the in-vehicle navigation apparatus 2 so that the operating power from the in-vehicle battery is supplied to the selected one or ones of the functional blocks and the in-vehicle navigation apparatus 2 performs low power consumption operation in a sleep mode. During the off state of the ACC signal, the controller 4 performs an ACC signal monitor operation to monitor the ACC signal while checking whether the ACC signal is turned on. When the controller 4 determines that the ACC signal is turned on, the controller 4 powers-on the in-vehicle navigation apparatus 2, causes the in-vehicle battery to supply the operating power to all of the functional blocks of the in-vehicle navigation apparatus 2, causes the in-vehicle navigation apparatus 2 to perform normal process, changes process from the ACC signal monitor process to main process, and starts performing the BT communication link connection process (see FIG. 3) as an interrupt process.

When the controller 4 starts performing the BT communication link connection process, the controller 4 causes at S1 the BT interface device 5 to transmits a BT connection request to the cellular phone 3. At S2, the controller 4 waits for the BT interface device 5 to receive a BT connection answer from the cellular phone 3. In the above, the BT connection answer contains identification information which makes it possible to identify the cellular phone 3. The identification information is, for example, a BT address or the like. When the controller 4 determines that the BT connection answer is received by the BT interface device 5, corresponding to "YES" at S2, the process proceeds to S3. At S3, the connection between the BT interface device 5 and the cellular phone 3 is made via the BT communication link. At S4, the connection using the HFP for handsfree communication is made between the BT interface device 5 and the cellular phone 3. At S5, the connection using the OPP for transfer for various data is made between the BT interface device 5 and the cellular phone 3. In the above, the controller 4 analyzes the identification information contained in the BT connection answer, and thereby identifies the cellular phone 3, which is a connection target of the BT communication link.

At S6, the controller 4 waits for the BT interface device 5 to receive the card information stored in the cellular phone 3 from the cellular phone 3, and the controller 4 determines whether the card information stored in the cellular phone 3 is received by the BT interface device 5. In the above, when a user operates the key input device of the cellular phone 3 to instruct the cellular phone 3 to transfer the card information stored in the cellular phone 3, the card information stored in the card information storage area of the cellular phone 3 is transmitted from the cellular phone 3 to the in-vehicle navigation apparatus 2. When the controller 4 determines that the BT interface device 5 receives the card information stored in the cellular phone 3 from the cellular phone 3, corresponding to "YES" at S6, the process proceeds to S7. At S7, the controller 4 records the card information, which is received from the cellular phone 3, in the card information storage area of the storage medium 7. Then, the process returns to the main process.

In the present embodiment, a user can record the card information on one or more calling cards one by one in the cellular phone 3 in advance: Then, the user can transfer the card information stored in the cellular phone 3 to the in-vehicle navigation apparatus 2 from the cellular phone 3 by switching the in-vehicle navigation apparatus 2 from power-off to power-on and then operating the cellular phone 3 to instruct the cellular phone 3 to transfer the card information.

More specifically, in the present embodiment, there are two way for recording card information in the in-vehicle navigation apparatus 2. A first way includes operating the touch operation input device 20 of the display apparatus 18 to directly record the card information in the in-vehicle navigation apparatus 2. A second way includes operating the key input device of the cellular phone 3 to record the card information in the cellular phone 3 and then transfer the card information to the in-vehicle navigation apparatus 2. In the second way, the card information is indirectly recorded in the in-vehicle navigation apparatus 2, in contrast to the first method. A user can record card information on a calling card in the in-vehicle navigation apparatus 2 in the first way or the second way.

(2) Telephone Communication Process with Use of Card Information

During the ON state of the ACC signal, the controller 4 performs the main processes and checks whether a call destination is set. When the controller 4 determines that a user sets a call destination by, for example, directly inputting a telephone number of the call destination or selecting the call destination with reference to phone book data, the controller 4 starts performing the telephone communication process with use of card information as an interrupt process, by changing process from the main process.

When the controller 4 starts performing the telephone communication process with use of card information, the controller 4 at S11 references the card information that is stored in the card information storage area of the storage medium 7 at that time. At S12, based on the referenced card information on the calling card, the controller 4 causes the cellular phone 3 to make a telephone call to a center (which provide telephone communication service using card information on a calling card) through transmitting the access number in the card information as a dialed telephone number, thereby causing the cellular phone 3 to have telephone connection to the center. Further, the controller 4 causes the cellular phone 3 to transmit the PIN code in the card information to the center.

At S13, the controller 4 causes the cellular phone 3 to transmits the telephone number of the call destination, which is set by a user prior to the start of this telephone communication process, to the center. In this process, when the card information on one calling card is stored in the card information storage area of the storage medium 7, the controller 4 uses the card information of the one calling card. In contrast, when the card information on multiple calling cards is stored in the card information storage area of the storage medium 7, the controller 4 selects the card information on one calling card from that on multiple calling cards according to a pre-determined selection criterion (e.g., a priority order that is pre-set by a user, and the like).

When the center receives the PIN code from the cellular phone 3, the center connects, via a telephone communication link, the cellular phone 3 and the other party assigned to the telephone number of the call destination transmitted from the cellular phone 3, provided that authentication of the received PIN code is successful. When the cellular phone 3 and the other party assigned to the telephone number of the call destination are connected to each other via the telephone communication link, the controller 4 performs at S14 the handsfree communication with the use of the card information on the calling card. A voice path between the cellular phone 3 and the in-vehicle navigation apparatus 2 is opened, and thereby an outgoing voice and an incoming voice can be transferred. More specifically, the incoming voice, which the cellular phone 3 receives via the communication network 21, is transferred to the in-vehicle navigation apparatus 2 and outputted from the speakers 15, 16. The outgoing voice, which is inputted via the microphone 13, is transferred from the in-vehicle navigation apparatus 2 to the cellular phone 3, and the outgoing voice is transmitted from the cellular phone 3 toward the other party via the communications network 21.

(1) BT Communication Link Connection Process

During the ON state of the ACC signal, the controller 4 performs the main processes and checks whether the ACC signal is turned off. When the controller 4 determines that the ACC signal is turned off, the controller 4 starts performing the BT communication link disconnection process as an interrupt process.

When the controller 4 starts performing the BT communication link disconnection process, the controller 4 at S21 causes the BT interface device 5 to transmit a BT disconnection request to the cellular phone 3. At S22, the controller 4 waits for the BT interface device 5 to receive a BT disconnection answer from the cellular phone 3 to determine whether the BT interface device 5 receives the BT disconnection answer from the cellular phone 3. When the controller 4 determines that the BT interface device 5 receives the BT disconnection answer, corresponding to "YES" at S22, the process proceeds to S23. At S23, the controller 4 disconnects the BT communication link between the BT interface device 5 and the cellular phone 3. At S24, the controller 4 erases the card information that is stored in the card information storage area of the storage medium 7 at that time. Then, the BT communication link disconnection process is ended, and the process returns to the main process.

According to the present embodiment, the in-vehicle navigation apparatus 2 is configured such that when the in-vehicle navigation apparatus 2 is switched from power-off to power-on, the in-vehicle navigation apparatus 2 and the cellular phone 3 are connected to each other via the BT communication link while using the OPP. Further, in response to user operation of the cellular phone 3, the card information stored in the cellular phone 3 is transferred from the cellular phone 3 to the in-vehicle navigation apparatus 2, and the transferred card information is recorded in the storage medium 7 of the in-vehicle navigation apparatus 2. According to this configuration, by recording card information in the cellular phone 3 in advance, it is possible to transfer the card information stored in the cellular phone 3 to the in-vehicle navigation apparatus 2 and record the transferred card information in the in-vehicle navigation apparatus 2 through powering-on the in-vehicle navigation apparatus 2 and operating the cellular phone 3. As a result, an operation (manipulation) of the touch operation input device 20 of the in-vehicle navigation apparatus 2 becomes unnecessary to input the card information to the in-vehicle navigation apparatus 2. By the use of the cellular phone 3, which is user-portable, it is possible to increases the freedom of environment for inputting card information, and it is possible to avoid such a situation where a stranger or a passenger see the card information. It is therefore possible to enhance security.

Moreover, in the present embodiment, since the card information stored in the card information storage area of the storage medium 7 is erased when the in-vehicle navigation apparatus 2 is switched from power-on to power-off, it is possible to prevent a third party from misusing the card information. In connection with the above, if the card information were left after the power off, a third party would misuse card information. It is therefore possible to enhance security.

Second Embodiment

A second embodiment is illustrated below with reference to FIG. 6. A difference between the first and second embodiments is that the second embodiment addresses a case where card information on multiple calling cards is stored in the card information storage area.

When the controller 4 starts performing a telephone communication process with use of card information, the controller 4 at S31 analyzes the location information that is acquired by the location information acquisition device 11 at that time. At S32, the controller 4 references the card information on the multiple calling cards stored in the card information storage area of the storage medium 7 at that time. At S33, the controller 4 selects the card information on one calling card from the card information on the multiple calling cards, so that the selected calling card corresponds to the present location. To select one calling card, the controller 4 may download information on a relationship between locations and calling cards from, for example, a server managed by a communications company. The information on the relationship may provide a database indicative of which one of calling cards provides cheapest telephone call cost at the present location. Based on the relationship, the controller 4 selects the calling card corresponding to the present location.

At S34, the controller 4 determines whether it is necessary to acquire the location information again. When the controller 4 determines that it is necessary to acquire the location information again, corresponding to "YES" at S34, the process returns to S31 so that S31 and its subsequent are performed again. When the controller 4 determines that it is not necessary to acquire the location information again, corresponding to "NO" at S34, the process proceeds to S35. At S35, by using the card information on the calling card selected at S33, the controller 4 causes the cellular phone 3 to transmit the access number in the card information as a dialed telephone number and causes the cellular phone 3 to have connection, via a telephone communication link, to the center (which provides telephone service using card information on a calling card). Further, the controller 4 causes the cellular phone 3 to transmit the PIN code in the card information to the center. At S36, the controller 4 transmits a telephone number of a call destination, which is preset by a user, to the center. At S37, in response to establishment of the telephone communication link between the cellular phone 3 and the other party assigned to the telephone number of the call destination, the controller 4 perform the handsfree communication with use of the card information on the calling card.

According to the present embodiment, when card information on multiple calling cards is stored in the call information storage area on a calling-card-by-calling-card basis, it is possible to perform the handsfree communication with use of the card information on one of the multiple calling cards that corresponds to the present location.

Other Embodiments

The above embodiments can be modified in various ways, examples of which are described below.

In the above embodiments, a telephone apparatus having a calling card support function is applied to the in-vehicle navigation apparatus. However, a telephone apparatus is not limited to the in-vehicle navigation apparatus. The telephone apparatus may be an in-vehicle handsfree apparatus without having a navigation function, an in-vehicle apparatus other than an in-vehicle handsfree apparatus, or the like, as long as the telephone apparatus has a function of performing telephone communication with use of card information of a calling card. Moreover, a telephone apparatus having a calling card support function is not limited to an in-vehicle apparatus mounted to a vehicle. For example, the telephone apparatus may be a portable device, which is user portable.

A profile used in transferring card information from a cellular phone to a telephone apparatus (e.g., an in-vehicle handsfree apparatus) is not limited to OPP and may be another profile. A telephone apparatus having a calling card support function may be configured such that, after establishment of a BT communication link, card information is automatically transmitted from a cellular phone to the telephone apparatus. In the above embodiments, the controller erases the card information upon determining that the telephone apparatus is switched from power-on to power-off. Alternatively, the controller may erase the card information after disconnection of HFP, regardless of whether the telephone apparatus is switched from the power-on to the power off.

In the above embodiments and modifications, the cellular phone 3 can act as a telephone communication device or means. The controller 4 can act as a control section or means, a power-on determination section or means, and a power-off determination section or means. The BT interface device 5 can act as a card information reception section or means, a data transfer protocol connection section or means, and a communication interface device or means. The storage medium 7 can act as a card information storage section or means. The location information acquisition device 11 can act as a location information acquisition section or means. The BT communication link is an example of a local wireless communication link. The OPP is an example of a data transfer protocol.

According to a first aspect of the present disclosure, a telephone apparatus having a calling card support function is provided. The telephone apparatus includes: a card information storage section provided to store therein card information on a calling card; a controller configured to make a telephone call with use of the card information on the calling card stored in the card information storage section, by using telephone communication means; and a card information reception section provided to receive, from a cellular phone, the card information on the calling card stored in the cellular phone. The controller is further configured to allow the card information reception section to receive, from the cellular phone, the card information on the calling card stored in the cellular phone. The controller is further configured to record the card information on the calling card received by the card information reception section in the card information storage section when the card information reception section receives the card information on the calling card stored in the cellular phone from the cellular phone.

According to the above telephone apparatus, for a user to record card information on a calling card in the telephone apparatus, the user needs not to directly operate the telephone apparatus. The user can record the card information in the telephone apparatus through operating the cellular phone to record the card information in the cellular phone and then transferring the card information stored in the cellular phone from the cellular phone to the telephone apparatus. As a result, to record card information on a calling card in the telephone apparatus, a user is not required to directly operate the telephone apparatus. It is possible to increases the freedom of environment for inputting card information with the use of the cellular phone (which is portable), and it is possible to avoid such a situation where a stranger or a passenger see the card information. It is therefore possible to enhance security.

The above telephone apparatus may further include: a power-on determination section configured to determine whether the telephone apparatus is switched from power-off to power-on; and a data transfer protocol connection section configured to establish connection to the cellular phone by using a data transfer protocol for data transfer, with the data transfer protocol connection section and the cellular phone being connected with each other via a local wireless communication link. The controller may allow the card information reception section to receive the card information on the calling card stored in the cellular phone from the cellular phone when the data transfer protocol connection section establishes, upon determination that the telephone apparatus is switched from the power-off to the power-on, the connection to the cellular phone by using the data transfer protocol.

According to this configuration, it is possible to transfer the card information stored in the cellular phone from the cellular phone to the telephone apparatus through recording the card information in the cellular phone in advance, and then powering on the telephone apparatus to establish connection between the telephone apparatus and the cellular phone using the data transfer protocol.

The above telephone apparatus may further include a power-off determination section configured to determine whether the telephone apparatus is switched from the power-on to the power-off. The controller may be further configured to erase, upon determination that that the telephone apparatus is switched from the power-on to the power-off, the card information stored in the card information storage section.

According to this configuration, it is possible to prevent a third party from misusing the card information. If the card information were left after the power off, a third party would misuse card information. It is therefore possible to enhance security.

The above telephone apparatus may further include: a location information acquisition section configured to acquire location information indicative of a present location of the telephone apparatus. The card information storage section may have a capacity for simultaneously storing the card information on multiple calling cards on a calling-card-by-calling-card basis. The controller may be further configured to select the card information of one calling card from that of the multiple calling cards stored in the card information storage section so that the selected one calling card corresponds to the present location. The controller may make the telephone call with use of the card information on the selected one calling card, by using the telephone communication means.

According to this configuration, it is possible to perform telephone communications by using the card information on the one calling card that provides cheapest communication cost at the present location among the multiple calling cards.

According to a second aspect of the present invention, a handsfree apparatus for a vehicle is provided. The handsfree apparatus includes: a location information acquisition device, a communication interface device, a storage medium and a controller. The location information acquisition device is configured to acquire location information indicative of a present location of the vehicle. The communication interface device is communicatable with a cellular phone via a local wireless communication link using a data transfer protocol for data transfer and a handsfree protocol for handsfree communication. The cellular phone stores therein card information on multiple calling cards on a calling-card-by-calling-card basis. The card information on each calling card includes an access number and a PIN code of the calling card. The controller that is configured to: determine whether the handsfree apparatus is powered-on or powered-off; establish a connection between the communication interface device and the cellular phone via the local wireless communication link, upon determining that the handsfree apparatus is powered-on; receive the card information on the multiple calling cards from the cellular phone via the local wireless communication link using the data transfer protocol; record the received card information on the multiple calling cards in the storage medium on the calling-card-by-calling-card basis upon receiving the card information on the multiple calling cards from the cellular phone, without requiring a user to directly input the card information to the handsfree apparatus; determine, in response to a handsfree communication request from a user, which one of the multiple calling cards provides cheapest telephone service at the present location of the vehicle; perform the handsfree communication with use of the card information on the one of the multiple calling cards that provides the cheapest telephone service, by utilizing the communication interface device and the cellular phone connected with other via the local wireless communication link using the handsfree protocol; and erase the card information on the multiple calling card from the storage medium upon determining that the handsfree apparatus is powered-off.

According to the above handsfree apparatus, for a user to record card information on a calling card in the handsfree apparatus, the user needs not to directly operate the handsfree apparatus. The user can record the card information in the handsfree apparatus through operating the cellular phone to record the card information in the cellular phone and then transferring the card information from the cellular phone to the handsfree apparatus. As a result, to record card information on a calling card in the handsfree apparatus, a user is not required to directly operate the handsfree apparatus. It is possible to increases the freedom of environment for Inputting card information with the use of the cellular phone, and it is possible to avoid such a situation where a stranger or a passenger see the card information. It is therefore possible to enhance security. Moreover, according to this configuration, it is possible to prevent a third party from misusing the card information. If the card information were left after the power off, a third party would misuse card information. It is therefore possible to enhance security. Furthermore, it is possible to perform telephone communications by using the card information on the one calling card that provides cheapest communication cost at the present location among the multiple calling cards.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of procedures, processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be installed in a computer via a communications network.

What is claimed is:

1. A telephone apparatus having a calling card support function, the telephone apparatus comprising:
   a card information storage section provided to store therein card information on a calling card;
   a controller configured to make a telephone call with use of the card information on the calling card stored in the card information storage section, by using telephone communication means;
   a card information reception section provided to receive, from a cellular phone, the card information on the calling card stored in the cellular phone, and
   a location information acquisition section configured to acquire location information indicative of a present location of the telephone apparatus,
   the controller being further configured to
      allow the card information reception section to receive, from the cellular phone, the card information on the calling card stored in the cellular phone and
      record the card information on the calling card received by the card information reception section in the card information storage section when the card information reception section receives, from the cellular phone, the card information on the calling card stored in the cellular phone;
   wherein the card information storage section has a capacity for simultaneously storing the card information on a plurality of calling cards on a calling-card-by-calling-card basis,
   wherein the controller is further configured to select the card information of one calling card from that of the plurality of calling cards stored in the card information storage section so that the selected one calling card corresponds to the present location,
   wherein the controller makes the telephone call with use of the card information on the selected one calling card, by using the telephone communication means.

2. The telephone apparatus having a calling card support function according to claim 1, further comprising:
   a power-on determination section configured to determine whether the telephone apparatus is switched from power-off to power-on; and
   a data transfer protocol connection section configured to establish connection to the cellular phone by using a data transfer protocol for data transfer, with the data transfer protocol connection section and the cellular phone being connected with each other via a local wireless communication link,
   wherein the controller is configured to allow the card information reception section to receive, from the cellular phone, the card information on the calling card stored in the cellular phone when the data transfer protocol connection section establishes, upon determination that the telephone apparatus is switched from the power-off to the power-on, the connection to the cellular phone by using the data transfer protocol.

3. The telephone apparatus having a calling card support function according to claim 1, further comprising:
   a power-off determination section configured to determine whether the telephone apparatus is switched from the power-on to the power-off,
   wherein the controller is further configured to erase, upon determination that that the telephone apparatus is switched from the power-on to the power-off, the card information stored in the card information storage section).

4. A handsfree apparatus for a vehicle, comprising:
   a location information acquisition device that is configured to acquire location information indicative of a present location of the vehicle;
   a communication interface device that is communicatable with a cellular phone via a local wireless communication link using a data transfer protocol for data transfer and a handsfree protocol for handsfree communication, the cellular phone storing therein card information on a plurality of calling cards on a calling-card-by-calling-card basis, the card information on each calling card including an access number and a PIN code of the calling card; and
   a storage medium; and
   a controller that is configured to:
      determine whether the handsfree apparatus is powered-on or powered-off;
      establish a connection between the communication interface device and the cellular phone via the local wireless communication link, upon determining that the handsfree apparatus is powered-on;
      receive the card information on the plurality of calling cards from the cellular phone via the local wireless communication link using the data transfer protocol;
      record the received card information on the plurality of calling cards in the storage medium on the calling-card-by-calling-card basis upon receiving the card information on the plurality of calling cards from the cellular phone, without requiring a user to directly input the card information to the handsfree apparatus;
      determine, in response to a handsfree communication request from a user, which one of the plurality of calling cards provides cheapest telephone service at the present location of the vehicle;
      perform the handsfree communication with use of the card information on the one of the plurality of calling cards that provides the cheapest telephone service, by utilizing the communication interface device and the cellular phone connected with other via the local wireless communication link using the handsfree protocol; and erase the card information on the plurality of calling card from the storage medium upon determining that the handsfree apparatus is powered-off.

* * * * *